United States Patent
Sri et al.

(10) Patent No.: US 9,600,828 B2
(45) Date of Patent: Mar. 21, 2017

(54) TRACKING OF NEAR CONVERSIONS IN USER ENGAGEMENTS

(71) Applicant: 24/7 Customer, Inc., Campbell, CA (US)

(72) Inventors: R. Mathangi Sri, Bangalore (IN); Ravi Vijayaraghavan, Bangalore (IN); Vaibhav Srivastava, Bangalore (IN); Prashant V. Ullegaddi, Bangalore (IN)

(73) Assignee: 24/7 Customer, Inc., Campbell, CA (US)

( * ) Notice: Subject to any disclaimer, the term of this patent is extended or adjusted under 35 U.S.C. 154(b) by 416 days.

(21) Appl. No.: 14/142,698

(22) Filed: Dec. 27, 2013

(65) Prior Publication Data
US 2014/0195298 A1    Jul. 10, 2014

Related U.S. Application Data

(60) Provisional application No. 61/751,141, filed on Jan. 10, 2013.

(51) Int. Cl.
*G06Q 30/00* (2012.01)
*G06Q 30/02* (2012.01)

(52) U.S. Cl.
CPC .............. *G06Q 30/0201* (2013.01)

(58) Field of Classification Search
CPC ........................... G06Q 10/00–50/00
USPC ............................... 705/7.11–7.42
See application file for complete search history.

(56) References Cited

U.S. PATENT DOCUMENTS

| 7,945,473 | B2* | 5/2011 | Fano | G06Q 10/087 705/14.1 |
|---|---|---|---|---|
| 8,914,285 | B2* | 12/2014 | Wasserblat | G10L 25/51 704/238 |
| 9,311,914 | B2* | 4/2016 | Wasserblat | G10L 15/02 |
| 2002/0082923 | A1* | 6/2002 | Merriman | G06Q 30/0222 705/14.23 |
| 2004/0162724 | A1* | 8/2004 | Hill | G10L 15/22 704/231 |
| 2005/0189415 | A1* | 9/2005 | Fano | G06Q 10/087 235/383 |
| 2008/0077462 | A1* | 3/2008 | Patel | G06Q 20/108 705/7.33 |
| 2008/0086402 | A1* | 4/2008 | Patel | G06Q 20/108 705/35 |

(Continued)

OTHER PUBLICATIONS

Boorom, Michael L., Jerry R. Goolsby, and Rosemary P. Ramsey. "Relational communication traits and their effect on adaptiveness and sales performance." Journal of the Academy of Marketing Science 26.1 (1998): 16-30.*

Takeuchi, Hironori, et al. "Automatic Identification of Important Segments and Expressions for Mining of Business-Oriented Conversations at Contact Centers." EMNLP-CoNLL. 2007.*

(Continued)

*Primary Examiner* — Alan S Miller
(74) *Attorney, Agent, or Firm* — Perkins Coie LLP (57) ABSTRACT

A computing method and system is disclosed for analyzing interactions between a user and a customer support agent. Typical interactions include inquiries about a product or service, and a service call. When the user purchases a good or service, or successfully completes a service call, the customer converts, e.g. the sales pitch or service solution was successful. If the customer does not convert, then the interaction between user and agent is analyzed to determine why the user did not convert and whether the user should be categorized for potential retargeting.

11 Claims, 8 Drawing Sheets

(56) References Cited

U.S. PATENT DOCUMENTS

| | | | |
|---|---|---|---|
| 2008/0162268 A1* | 7/2008 | Gilbert | G06Q 10/06375 705/7.29 |
| 2008/0177600 A1* | 7/2008 | McCarthy | G06Q 10/0639 705/7.33 |
| 2009/0012826 A1* | 1/2009 | Eilam | G06Q 30/02 705/7.31 |
| 2009/0119161 A1* | 5/2009 | Woda | G06Q 10/00 705/7.29 |
| 2010/0049679 A1* | 2/2010 | Phillips | G06Q 30/02 706/15 |
| 2011/0125793 A1* | 5/2011 | Erhart | G06Q 30/02 707/776 |
| 2011/0238410 A1* | 9/2011 | Larcheveque | G06F 17/2785 704/9 |
| 2011/0243311 A1* | 10/2011 | Aldrich | H04M 3/2281 379/88.14 |
| 2012/0076283 A1* | 3/2012 | Ajmera | G06Q 10/10 379/93.17 |
| 2013/0325530 A1* | 12/2013 | Pal | G06Q 30/0204 705/7.11 |
| 2014/0025376 A1* | 1/2014 | Wasserblat | G10L 25/51 704/238 |
| 2014/0195562 A1* | 7/2014 | Hardeniya | G06Q 30/0256 707/776 |

OTHER PUBLICATIONS

Takeuchi, Hironori, et al. "Getting insights from the voices of customers: Conversation mining at a contact center." Information Sciences 179.11 (2009): 1584-1591.*

* cited by examiner

TRACKING OF NEAR CONVERSIONS IN USER ENGAGEMENTS

CROSS REFERENCE TO RELATED APPLICATIONS

This application claims priority to U.S. provisional patent application Ser. No. 61/751,141, filed Jan. 10, 2013, which application is incorporated herein in its entirety by this reference thereto.

BACKGROUND OF THE INVENTION

Technical Field

The invention relates to tracking users in a sales environment. More particularly, the invention relates to tracking near conversions of prospective users during user engagements.

Description of the Background Art

A user service representative or agent may interact with a user for any of a variety of reasons, including offering a product and/or services for sale, service query resolution, providing information, etc. During such interaction, the agent communicates with the user via such channels as chat, telephone, VoIP, and so on. In some such interactions, the agent may not able make a sale or provide a resolution to user queries. Such situation is generally referred to as not being able to close out the transaction. This may be due to any of several reasons, such as the cost of the product being offered for sale, service terms under which the product is being made available, features of the product, availability of the product, and so on.

The data arising out of interactions between the agent and the user may yield valuable business intelligence. For example, such data may identify a significant point in the conversation between the agent and the user when the user was dropped, the level of interest of the user, the reason that the user was not closed, user demographic information, the product of interest to the user, and so on.

Currently, there is no way to analyze such interaction data, e.g. when the interaction did not result in closing out the transaction. Thus, it is not possible to predict whether a particular user had a high propensity of conversion, such that the user should be targeted again.

SUMMARY OF THE INVENTION

Embodiments of the invention analyze interactions between a user and a customer support agent. Typical interactions include inquiries about a product or service, and a service call. When the user purchases a good or service, or successfully completes a service call, the customer is deemed to have converted, i.e. the sales pitch or service solution was successful. If the customer does not convert, then the interaction between user and agent is analyzed to determine why the user did not convert, and to determine whether the user was a near convert who should be categorized for potential retargeting.

DETAILED DESCRIPTION OF THE INVENTION

Analysis of customer purchase behavior, a critical part of customer relationship management (CRM), continues to evolve. A primary objective of a service support agent is to convert a user who is potentially interested in a good or service into a user who actually purchases the good or service, whether the good or service was offered by a customer support agent or found independently by the user.

Embodiments of the invention analyze interactions between a user and a customer support agent. Typical interactions include inquiries about a product or service, and a service call. When the user purchases a good or service, or successfully completes a service call, the customer is said to have converted, i.e. the sales pitch or service solution was successful. If the customer does not convert, then the interaction between user and agent is analyzed to determine why the user did not convert, and whether the user should be categorized as a near convert for potential retargeting.

Thus, such analysis of the interaction between the user and the agent determines, based on a threshold (i.e., probability of sale), whether the user was a near-convert. In embodiments of the invention, the analysis is based at least in part on transcripts between the user and the agent. The user is categorized based on business intelligence (BI) that results from such analysis. User categories are selected for retargeting users who are near-converts, and users who may be future customers, via various channels including telephone, email, and so on.

Figure 1:
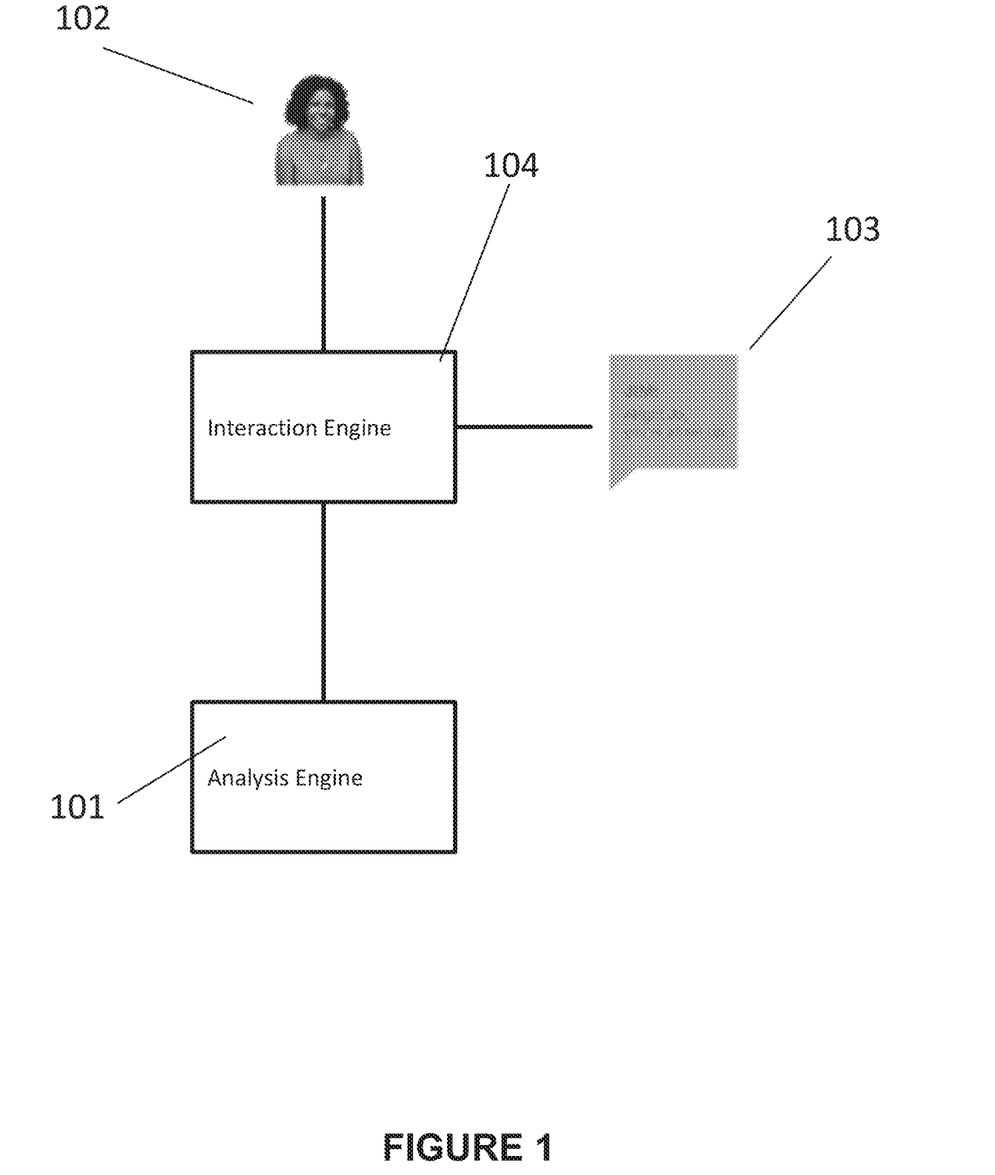
FIG. 1 is a block schematic diagram that shows an apparatus for tracking near conversions in user engagements according to the invention.

FIG. 1 is a block schematic diagram that shows an apparatus for tracking near conversions in user engagements according to the invention. Embodiments of the invention that are discussed herein concern user management in a sales and/or service environment, although those skilled in the art will appreciate that the invention has other applications. The apparatus shown in FIG. 1 comprises an interaction engine 104. A user 102 and an agent 103 access the interaction engine 104 and interact with each other using the interaction engine 104. The interaction engine 104 uses any available channel, such as chat, telephone, or a combination of chat and telephone as the mode of interaction.

Once an agent 103 has finished interacting with a user 102, the user 102 is categorized into a converted user or a non-converted user. For purposes of the discussion herein, the converted user is defined as a user 102 with whom the agent 103 has been able to complete the transaction, where the transaction can be any of, for example, a sales transaction, resolution of service query, etc. For purposes of the discussion herein, the non-converted user is defined as a user 102 with whom the agent 103 was unable to complete the conversion. The users can be appropriately flagged by the agent 103 or by the analysis engine 101.

In embodiments of the invention, the analysis engine 101 accesses the transcripts of the interaction between the agent 103 and the non-converted user 102 in a textual format. If the interaction between the agent 103 and the non-converted user 102 includes a voice based interaction, e.g. over the telephone, Internet, or any other suitable channel, then a suitable mechanism is included for transcribing the interaction into textual format.

The analysis engine 101 analyzes the transcripts and, on the basis of this analysis, identifies near converted users. For purposes of the discussion herein, near converted users are those non-converted users who have a high probability of being converted. Near converted users may be re-targeted through various channels of interaction including, for example, an offline campaign, e.g. an email campaign. The analysis engine 101 can also use such analysis to target future users.

In another embodiment of the invention, the analysis engine 101 also analyzes the journeys of a sample set of users who have visited the sales and/or service environment. The sample set of users comprises converted users, non-converted users, and users who have been designated as near converted users. Based on the analysis, the analysis engine 101 builds a model that creates a correlation between the journeys, interactions and the type of user, e.g. converted/non-converted. In an offline process, all interactions are processed and potential near converts are predicted using the method prescribed herein and their identity is stored in the database, for example through the use of one or more cookies. When the analysis engine 101 detects a user interacting with the online sales environment, a CRM dip is performed to determine if this user was a potential near convert in the past. If so, the user is offered a different visitor experience based on what was discussed in the user's previous interaction. The analysis engine 101 then modifies the visitor experience, such that the user may become a converted user. The modification may be in the form of introducing a mode for an agent to interact with the user, such as a chat window, a re-arrangement of the menu options, and any other suitable modification.

Figure 2:
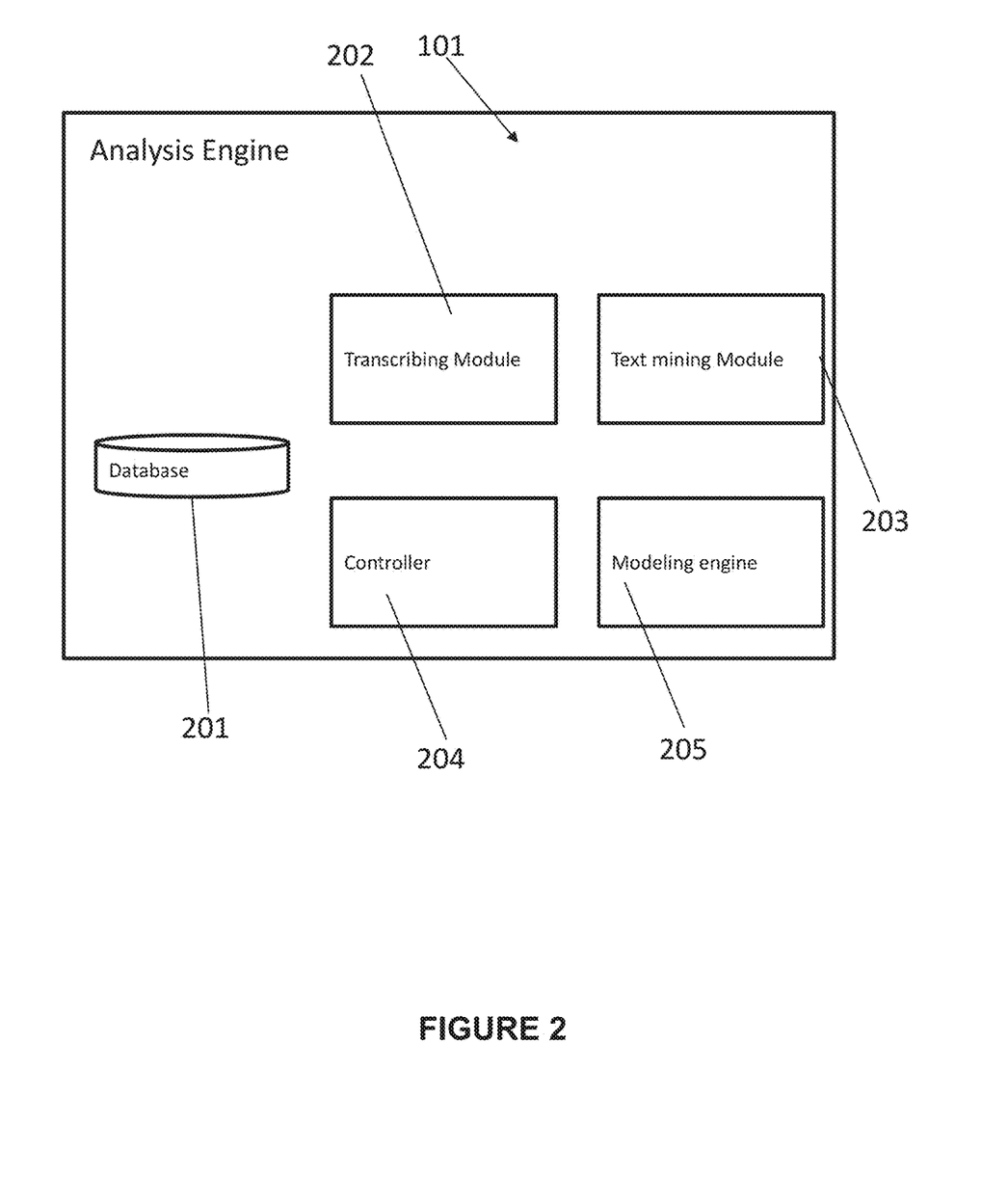
FIG. 2 is a block schematic diagram that shows an analysis engine according to the invention.

FIG. 2 is a block schematic diagram that shows an analysis engine according to the invention. In embodiments of the invention, the analysis engine 101 comprises a database 201, a transcribing module 202, a text mining module 203, a controller 204, and a modeling engine 205. The controller 204 receives transcripts of agent interactions with the non-converted user 102 from the interaction engine 104. The transcripts are received by the controller 204 from the transcribing module 202, which transcribes voice interactions between the user 102 and the agent 103. In another embodiment of the invention, the controller 204 sends the transcript to the text mining module 203.

Figure 3:
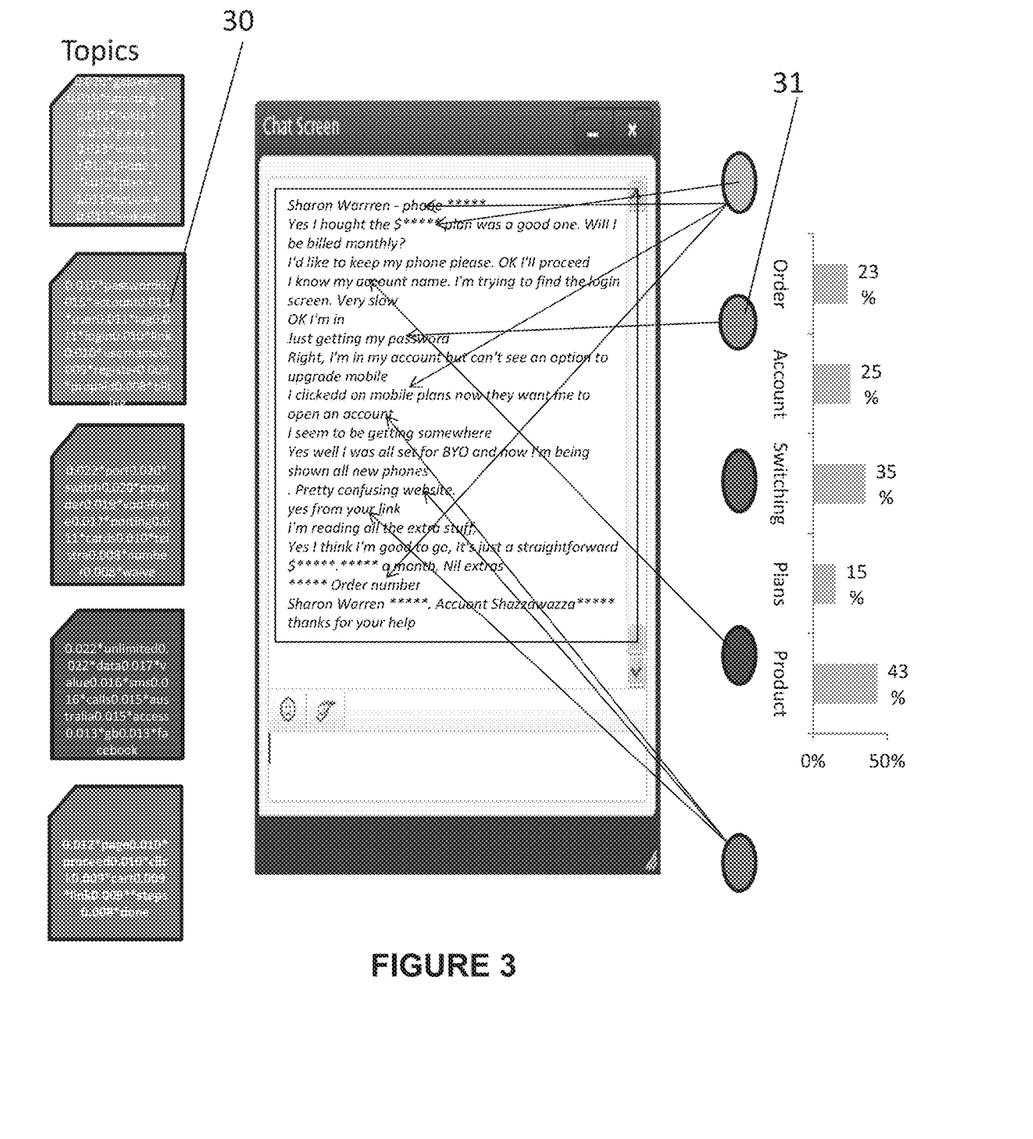
FIG. 3 is a chat screen showing a sample chat represented as a distribution of topics according to the invention.

Initially, the text mining module 203 performs topic modeling, i.e. a process that identifies relevant latent topics in a text corpus, to represent transcripts in terms of a set of N topics, where the value for N is chosen appropriately by experimentation. For purposes of the discussion herein, a topic is a distribution over the vocabulary, i.e. all words in the transcripts. This is shown in FIG. 3, which is a chat screen showing a sample chat represented as a distribution of topics according to the invention. All of the topics identified over the corpus are shown on the left side of FIG. 3. Each topic shown is a mixture of the words with each word weighted according to its importance in that topic. For example, one can easily look at the second topic number 30 and connect it with 'account related issues' 31. A chat is represented as a set of such topics in FIG. 3.

The text mining module 203 analyzes the transcripts of interactions over a period of time to obtain a topic model comprising N topics. The text mining module 203 uses a model such as, for example, Latent Sematic Indexing (LSI), Probabilistic LSI (PLSI), or Latent Dirichlet Allocation (LDA) to identify the topics that are present in the transcript. The controller 204 builds a probabilistic binary classifier, for example a logistic regression, in which sales conversion is a response variable, and in which the topics received from the text mining module are independent variables, and then determines weights for each of the topics.

$$\text{Probability(Sale)}=f(\text{topic1}, \ldots ,\text{topicN}) \tag{1}$$

where the Probability of a Sale happening in a chat is modeled as a function of the topics identified for that chat.

On receiving a transcript, the text mining module 203 analyzes the transcript and identifies the topics that are present in the transcript. In embodiments of the invention, the text mining module 203 uses a model such as, for example, Latent Sematic Indexing (LSI), Probabilistic LSI (PLSI), and Latent Dirichlet Allocation (LDA) to identify the topics that are present in the transcript. The text mining module 203 identifies purchase and/or sale information that corresponds to the transcript by examining the disposition of the agent associated with the transcript. In embodiments of the invention, the disposition of the agent comprises such information as sale information in the transcript that indicates whether or not a sale was made. Such disposition is filled by the agent after the chat is over. For embodiments of the invention within the IVR domain, the IVR call is converted to text. The sale information for an IVR call is obtained by tracking the IVR journey. Sale information is logged as an IVR event which is used for creating a training sample. Similarly, for Web journeys, the sale information is tracked in the journey.

Based on the identified topics present in the transcript, the controller 204 scores the transcript. Here, the score is the probability of a sale convert. Hence, the score is between 0.0 and 1.0, inclusive, where the higher the probability, more chances are that this interaction was almost a convert, i.e. a near convert. Based on the score, the controller 204 classifies the transcripts as near convert users. In an embodiment of the invention, the controller 204 classifies transcripts having a high score as those related to a near converted user; whereas transcripts having a low score are classified as these related to users with a low chance of being converted. In embodiments of the invention, the threshold for deciding if a user is near converted user may also be decided by an authorized person or through active learning. In the case of retargeting by email campaigns, thresholding can also be appropriately determined based on the number of users that need to be targeted.

Near Convert Analysis

Figure 4:
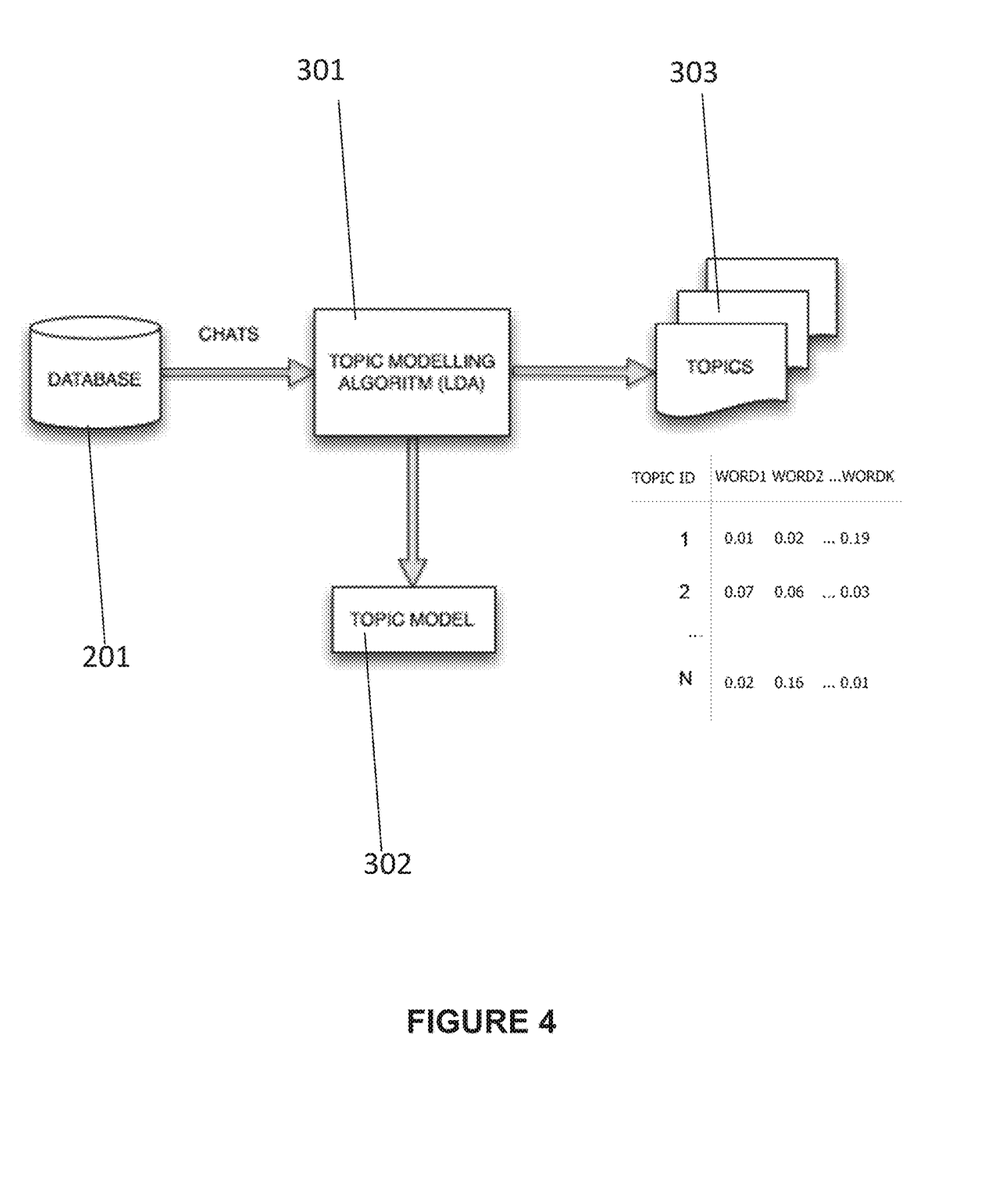
FIG. 4 is a block schematic diagram that shows the training of a topic model according to the invention.

FIG. 4 is a block schematic diagram that shows the training of a topic model according to the invention. A topical distribution of text chats is learned by training a topic model (LDA—Latent Dirichlet Allocation) 301 on a dataset of chats 201. Each topic, e.g. identified as Topic ID 1-N, is a distribution over all the words in the chat corpus, e.g. WORD1-WORDK, also referred to herein as the vocabulary of the corpus. As a result, a set of the topics present in the chat corpus 303 and a topic model 302 is produced, which then can be used to identify topic distribution in new chat texts.

Figure 5:
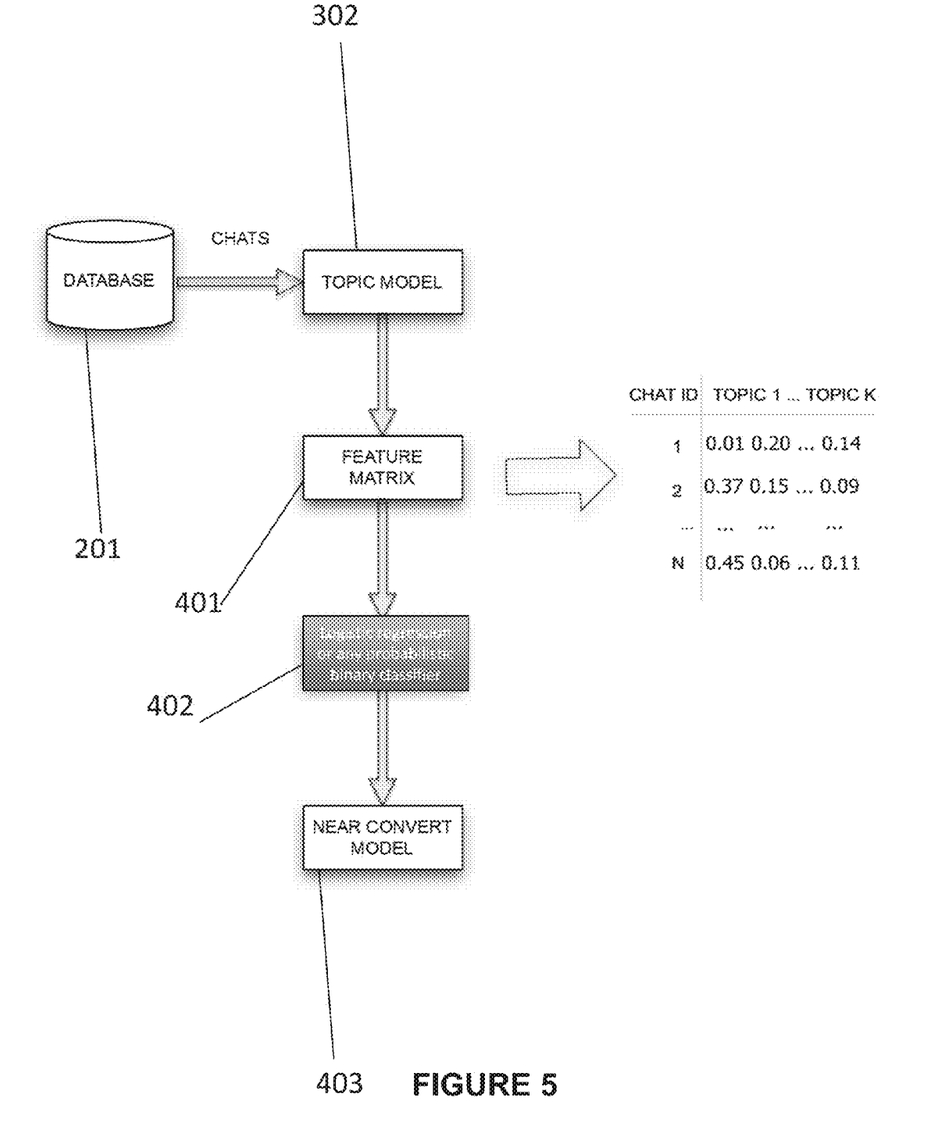
FIG. 5 is a block schematic diagram that shows the training of a logistic regression for sale prediction according to the invention.

FIG. 5 is a block schematic diagram that shows the training of a probabilistic binary classifier, e.g. logistic regression for sale prediction according to the invention. A set of text chats is fetched from the database 201 along with sales response information. After end of each chat, call center agents indicate whether the sale was successful or not. Every chat is represented as a topic distribution 302, which forms feature matrix 401 for training. See, for example, the probability distributions for TOPIC1-TOPICK as shown in FIG. 5 against each of Chat ID 1-N. A logistic regression model 402, or any other probabilistic binary classifier, is trained on the feature matrix using sales information as a response, and a near convert model is thus produced 403. A logistic regression is model that learns the mappings from the given topic distribution of the chat to its given sale response. Whenever a new non-converted chat of a user is given, the regression model associates a probability of sale, i.e. a score, to this new chat. This probability is then used to determine if the given user was a potential near convert.

Figure 6:
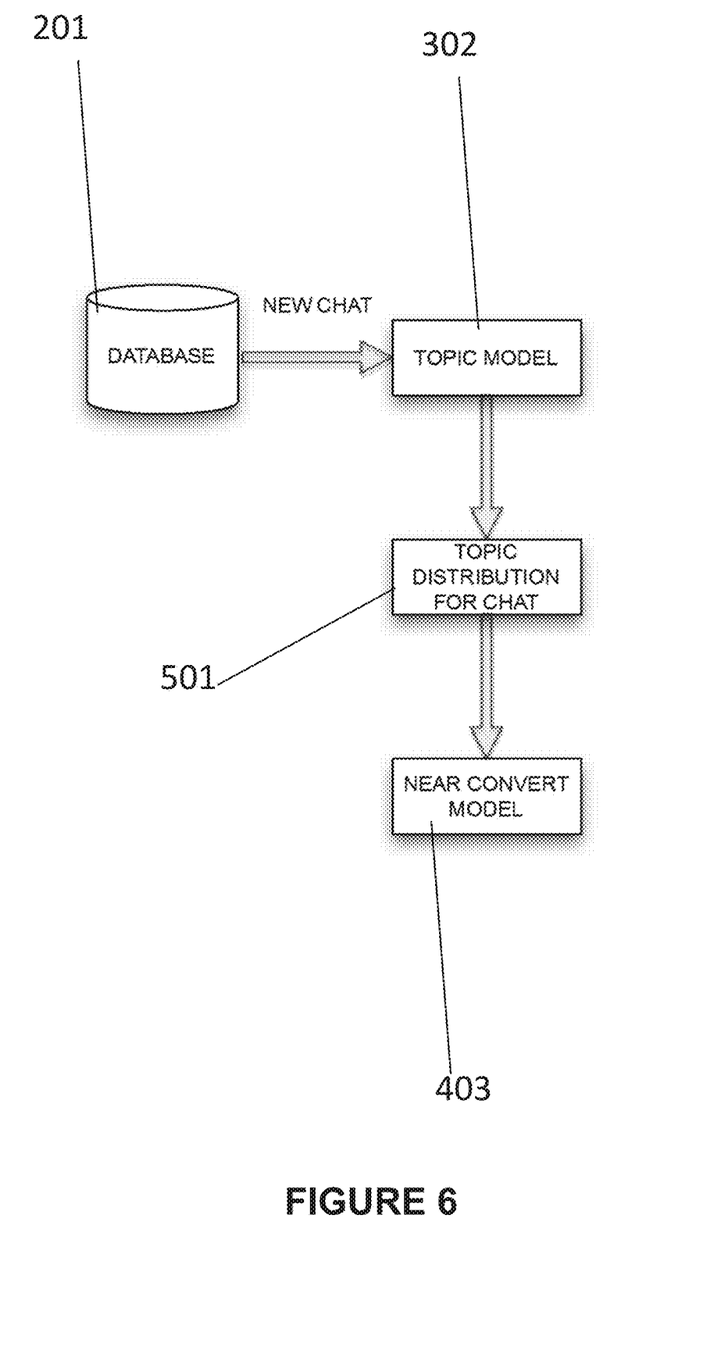
FIG. 6 is a block schematic diagram that shows the predicting of near-sale-converts based upon new text chats according to the invention.

FIG. 6 is a block schematic diagram that shows the predicting of near-sale-converts based upon new text chats according to the invention. Every new chat which was non-convert, i.e. where a sale did not occur, is represented as a distribution of topics 501 using the topic model 302 and is classified by the near convert model 403. This process of topical representation is illustrated with an example in the FIG. 3. The near convert model outputs the sale probability S given the chat. If the value of S is above a predetermined threshold T, then this chat is identified as a near convert. The threshold is determined by the number of near converts that are needed for retargeting. If the number of users to be retargeted is relatively high, then a threshold that is quite lower can be chosen. On the contrary, if the number is low, as in the case where it is desired that the probability of the near convert be as high as possible, the threshold can be set very high, e.g. >0.6.

Method for Identifying Near-Converted Users

Figure 7:
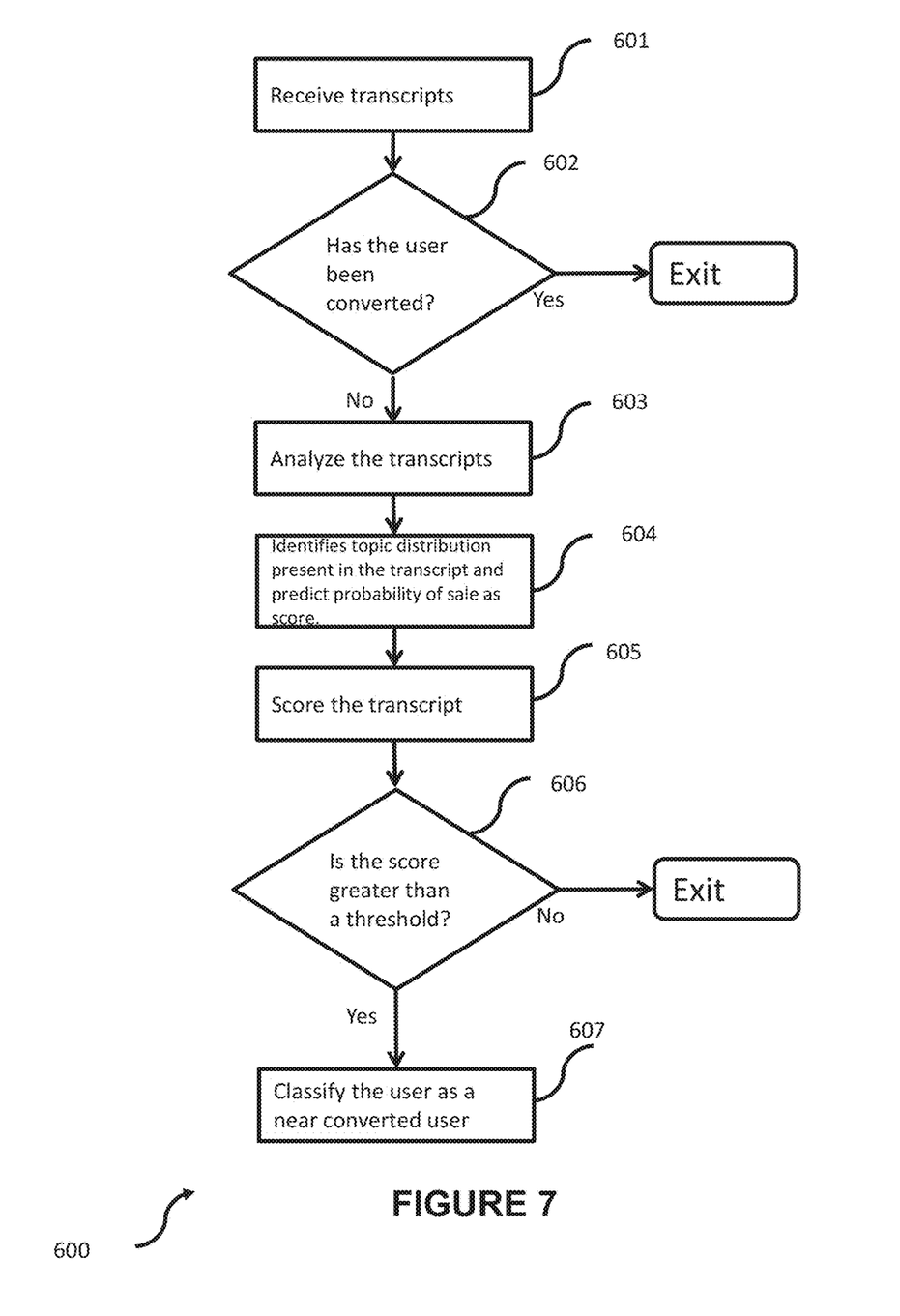
FIG. 7 is a flow diagram that shows a method for identifying a user as a near-converted user according to the invention.

FIG. 7 is a flow diagram that shows a method (600) for identifying a user as a near-converted user according to the invention. In FIG. 7, a user is identified as a near converted user and a suitable campaign is then planned for such near converted users. The analysis engine 101 receives (601) the transcripts from the interaction engine 104. If the transcripts are received by the analysis engine 101 in a voice format they are transcribed by the analysis engine 101.

The analysis engine 101 checks (602) if the user corresponding to the transcript has been converted, for example by checking the information present in the disposition of the agent responsible for the interaction. If the user has not been converted, the analysis engine 101 analyzes (603) the transcripts and identifies (604) the topics present in the transcript using the topic model that was built before in the corpus. This process is illustrated in FIG. 3. Based on the topics present in the transcript, the analysis engine 101 scores (605) the transcript.

The analysis engine 101 also checks (606) if the score is above a predetermined threshold. In embodiments of the invention, the threshold for deciding if a user is near converted user may be decided by an authorized person. Further, the threshold can be readjusted based on the users who were retargeted by active learning. Active learning takes the feedback of the user at run time, e.g. how did the user react to a contextual invite or retarget, and incorporates the same to tune the model and/or threshold. If the score is above a threshold, the analysis engine 101 classifies (607) the user corresponding to the transcript as a near converted user.

In another embodiment of the invention, users who have had no interaction with an agent, but who have undertaken a journey related to a product or a service, such as by navigating across a Web site, are also classified as near converted users, based on their journey.

The various actions shown in FIG. 7 may be performed in the order presented, in a different order or simultaneously. Further, in some embodiments of the invention, some of the actions shown in FIG. 7 may be omitted.

Computer Implementation

The embodiments of the invention disclosed herein concern the optimization of ad words based on performance across multiple channels. This allows integration of various data sources to provide a better understanding of the user intent associated with user entered search terms. The embodiments disclosed herein can be implemented through at least one software program running on at least one hardware device and performing network management functions to control the network elements. The network elements shown in FIGS. 1 and 2 include blocks which can be at least one of a hardware device, or a combination of hardware device and software module.

Figure 8:
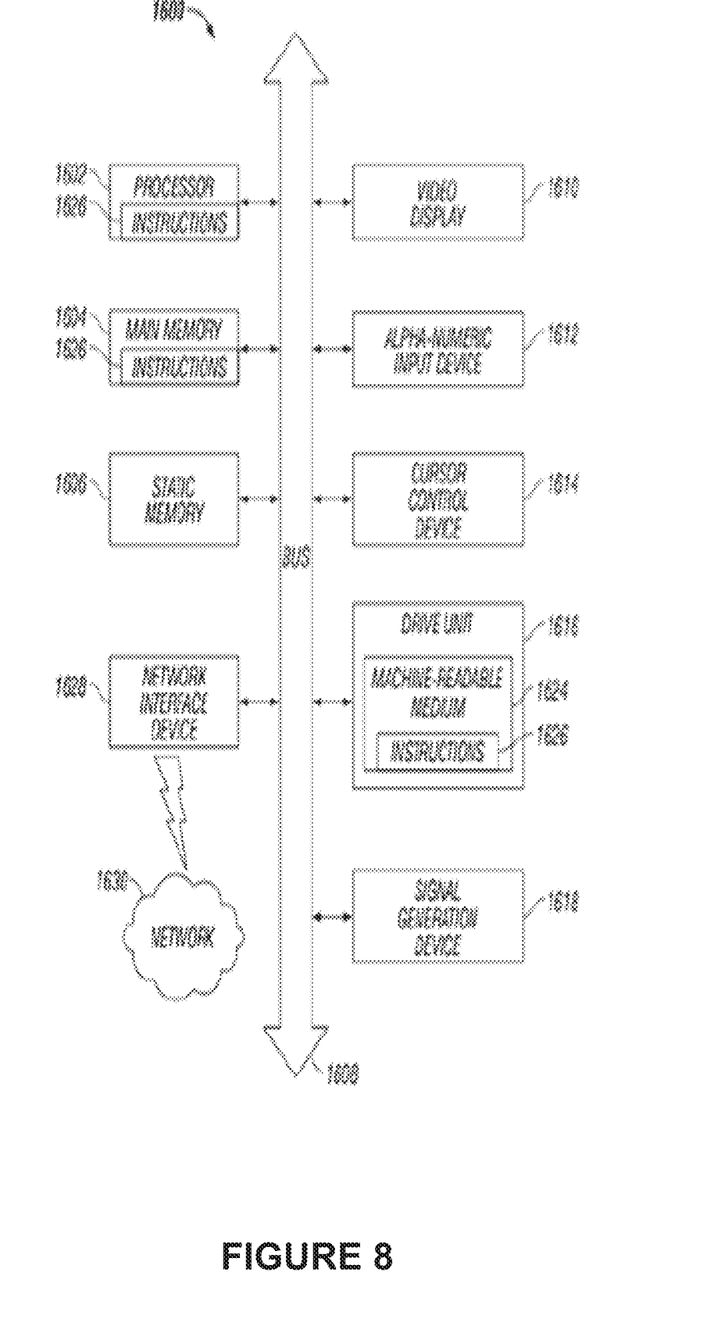
FIG. 8 is a block schematic diagram that depicts a machine in the exemplary form of a computer system within which a set of instructions for causing the machine to perform any of the herein disclosed methodologies may be executed.

FIG. 8 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant, a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for user analysis, comprising:
   connecting a user and an agent to an interaction engine;
   tracking interactions between the user and the agent with the interaction engine;
   an analysis engine analyzing interactions between said user and said agent to determine why the user did not convert, and whether the user should be categorized as a near convert for potential retargeting, wherein near converted users are those non-converted users who have a high probability of being converted;
   said analysis engine further comprising a text mining module that is configured for performing topic modeling to represent user and agent interaction transcripts in terms of a set of N topics;
   wherein a topic is a distribution over a vocabulary that comprises all words in the transcripts;
   wherein said text mining module analyzes said transcripts of interactions over a period of time to obtain a topic model comprising said N topics;
   wherein on receiving a transcript, said text mining module analyzes said transcript and identifies the topics that are present in the transcript;
   wherein said analysis engine further comprises a control module that builds a model in which sales conversion is a response variable, and in which topics received from said text mining module are independent variables;
   wherein based on the identified topics present in the transcript, the control module scores the transcript;
   said analysis engine, based on said score, categorizing the interaction between the user and the agent into categories;
   flagging, based on the categories, the user for retargeting; and
   said analysis engine, retargeting the user based on the flagging of the user, wherein said retargeting attempts to convert a user who is potentially interested in a good or service into a user who actually purchases the good or service by modifying the user's experience.

2. The method of claim 1, wherein said interactions comprise inquiries about a product or service, and a service call.

3. The method of claim 1, further comprising:
   analyzing interactions between said user and said agent to determine, based on a threshold, whether the user is a near-convert.

4. The method of claim 1, further comprising:
   analyzing said interactions based on transcripts between said user and said agent.

5. The method of claim 1, further comprising:
   selecting categories for retargeting users who are near-converts via any of a plurality of channels.

6. A method for tracking near conversions in user engagements, comprising:
   providing an interaction engine by which a user and an agent interact with each other, said interaction engine using any of a plurality of available channels as a mode of interaction;
   providing an analysis engine for categorizing said user into a converted user or a non-converted user;
   wherein a converted user is a user with whom the agent has been able to complete a transaction;
   wherein a non-converted user is a user with whom the agent was unable to complete the transaction;
   wherein said analysis engine is configured for accessing transcripts of interactions between said agent and said non-converted user in a textual format;
   wherein said analysis engine is configured for analyzing said transcripts to identify near converted users, wherein near converted users are those non-converted users who have a high probability of being converted;
   wherein said analysis engine is configured for analyzing journeys of a sample set of users, wherein said sample set of users comprises converted users, non-converted users, and users who have been designated as near converted users;
   based on said analysis, said analysis engine builds a model that creates a correlation between the journeys and the type of user;
   wherein when said interaction engine detects user interaction, said analysis engine maps a type of user to one of a potential converted user, a potential non-converted user, or a potential near converted user by mapping a current journey of the user to said model; and
   said interaction engine retargeting near converted users, wherein said retargeting attempts to convert a user who is potentially interested in a good or service into a user who actually purchases the good or service by modifying the user's experience;
   said analysis engine further comprising a text mining module that is configured for performing topic modeling to represent user and agent interaction transcripts in terms of a set of N topics;
   wherein a topic is a distribution over a vocabulary that comprises all words in the transcripts;
   wherein said text mining module analyzes said transcripts of interactions over a period of time to obtain a topic model comprising said N topics;
   wherein on receiving a transcript, said text mining module analyzes said transcript and identifies the topics that are present in the transcript;
   wherein said analysis engine further comprises a control module that builds a model in which sales conversion is a response variable, and in which topics received from said text mining module are independent variables;
   wherein based on the identified topics present in the transcript, the control module scores the transcript;
   wherein based on the score, the control module classifies the transcripts as near convert users;
   wherein transcripts having a high score are those related to a near converted user; and
   whereas transcripts having a low score are classified as these related to users with a low chance of being converted.

7. The method of claim 6, further comprising:
providing a mechanism for transcribing a voice based interaction between said agent and said non-converted user into textual format.

8. The method of claim 6, wherein said control module determines weights for each of the topics.

9. The method of claim 8,
wherein said text mining module identifies purchase and/or sale information that corresponds to the transcript by examining the disposition of the agent associated with the transcript, wherein the disposition of the agent comprises sale information in the transcript that indicates whether or not a sale was made.

10. A method for identifying a user as a near-converted user, comprising:
an analysis engine receiving one or more transcripts of user and agent interactions from an interaction engine;
said analysis engine checking if a user corresponding to the transcript has been converted by checking information present in the disposition of an agent responsible for the user interaction;
wherein if the user has not been converted, the analysis engine analyzes the transcripts and identifies topics present in the transcript;
said analysis engine further comprising a text mining module that is configured for performing topic modeling to represent user and agent interaction transcripts in terms of a set of N topics;
wherein a topic is a distribution over a vocabulary that comprises all words in the transcripts;
wherein said text mining module analyzes said transcripts of interactions over a period of time to obtain a topic model comprising said N topics;
wherein on receiving a transcript, said text mining module analyzes said transcript and identifies the topics that are present in the transcript;
wherein said analysis engine further comprises a control module that builds a model in which sales conversion is a response variable, and in which topics received from said text mining module are independent variables;
wherein based on the topics present in the transcript, the analysis engine scores the transcript;
wherein the analysis engine checks if the score is above a predetermined threshold;
wherein if the score is above a threshold, the analysis engine classifies the user corresponding to the transcript as a near converted user, wherein near converted users are those non-converted users who have a high probability of being converted; and
said interaction engine retargeting near converted users, wherein said retargeting attempts to convert a user who is potentially interested in a good or service into a user who actually purchases the good or service by modifying the user's experience.

11. The method of claim 10, wherein users who have had no interaction with an agent, but who have undertaken a journey related to a product or a service by navigating across a Web site, are classified as near converted users, based on their journey.

\* \* \* \* \*